Nov. 25, 1941.    J. P. SPANG    2,263,854
MEAT-SLITTING MACHINE
Filed Dec. 23, 1938    3 Sheets-Sheet 1

Inventor.
Joseph P. Spang
by Heard Smith & Tennant.
Attys.

Nov. 25, 1941. J. P. SPANG 2,263,854
MEAT-SLITTING MACHINE
Filed Dec. 23, 1938 3 Sheets-Sheet 2

Inventor.
Joseph P. Spang
by Heard Smith & Tennant.
Attys.

Nov. 25, 1941.    J. P. SPANG    2,263,854
MEAT-SLITTING MACHINE
Filed Dec. 23, 1938    3 Sheets-Sheet 3
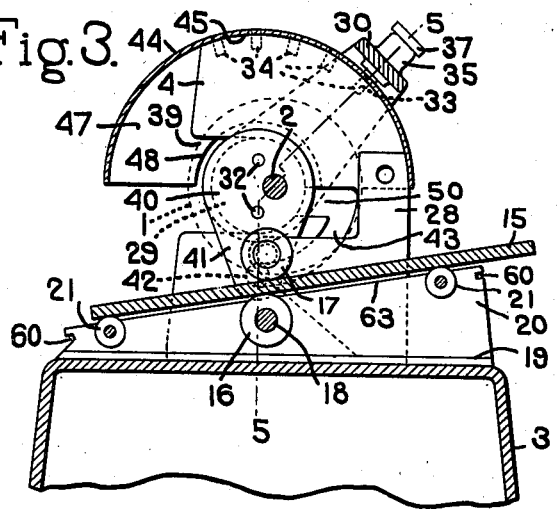
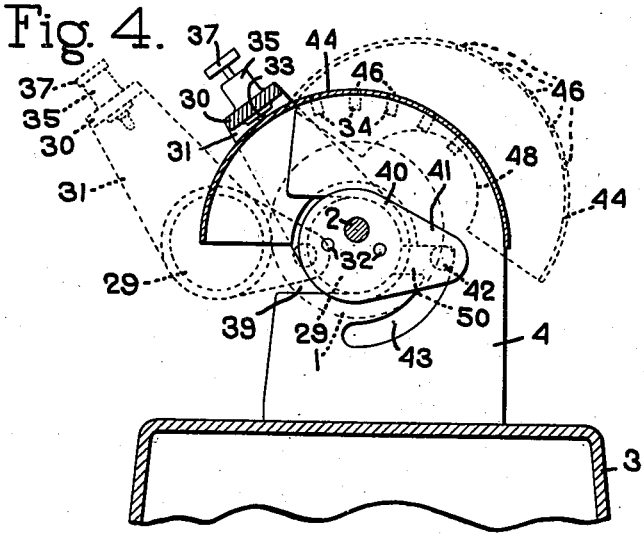
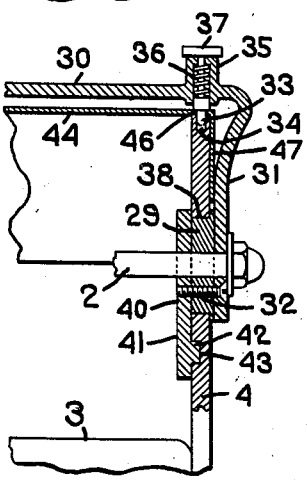
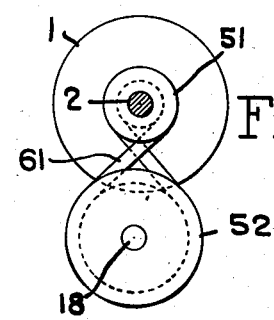
Inventor.
Joseph P. Spang
by Heard Smith & Tennant.
Attys.

Patented Nov. 25, 1941

2,263,854

UNITED STATES PATENT OFFICE 2,263,854

MEAT-SLITTING MACHINE

Joseph P. Spang, Quincy, Mass., assignor to Cube Steak Machine Company, Inc., Boston, Mass., a corporation of Massachusetts Application December 23, 1938, Serial No. 247,444

16 Claims. (Cl. 17—27)

This invention relates to meat slitting machines of the type having a plurality of rotary slitting knives, and a meat supporting plate which is fed through the machine beneath the knives and by which the slice of meat to be slit is carried into engagement with the knives to have the slits cut therein.

The machine herein illustrated is of that type in which the knives are adjustable toward and from the meat supporting plate to provide for cutting in the meat slits of different depths, and in which the knives are protected or guarded by a guard member which is carried by the frame.

One feature of the present invention relates to a novel construction which facilitates the removal of the knife assembly from the frame whenever it is desired to clean, sharpen, or repair the knives.

Another feature of the invention relates to a novel construction by which there is interlocking engagement between the guard member and the means for adjusting the knives, and in which the means for adjusting the knives serves to hold or lock the guard member in its operative position.

Other features of the invention relate to various improvements in meat slitting machines which will be more fully hereinafter set forth.

Referring now to the drawings.

Figure 1:
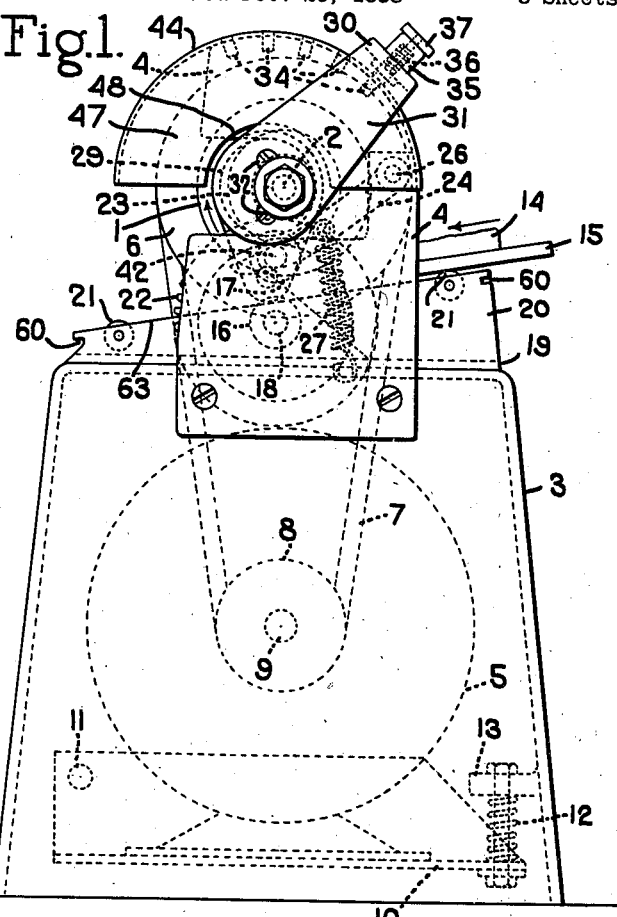
Fig. 1 is a side view of a meat slitting machine embodying my invention.
Figure 7:
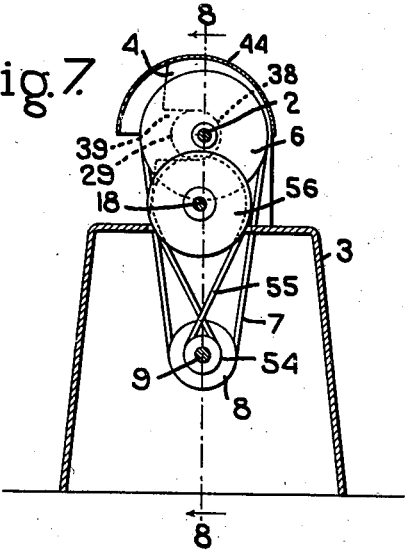
Figure 8:
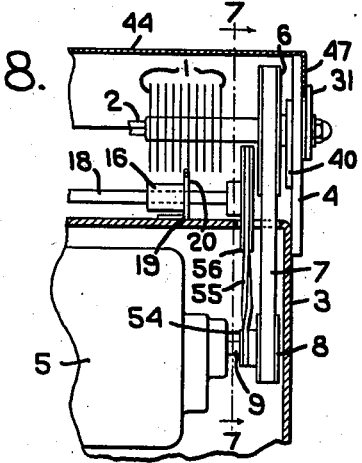
Figure 2:
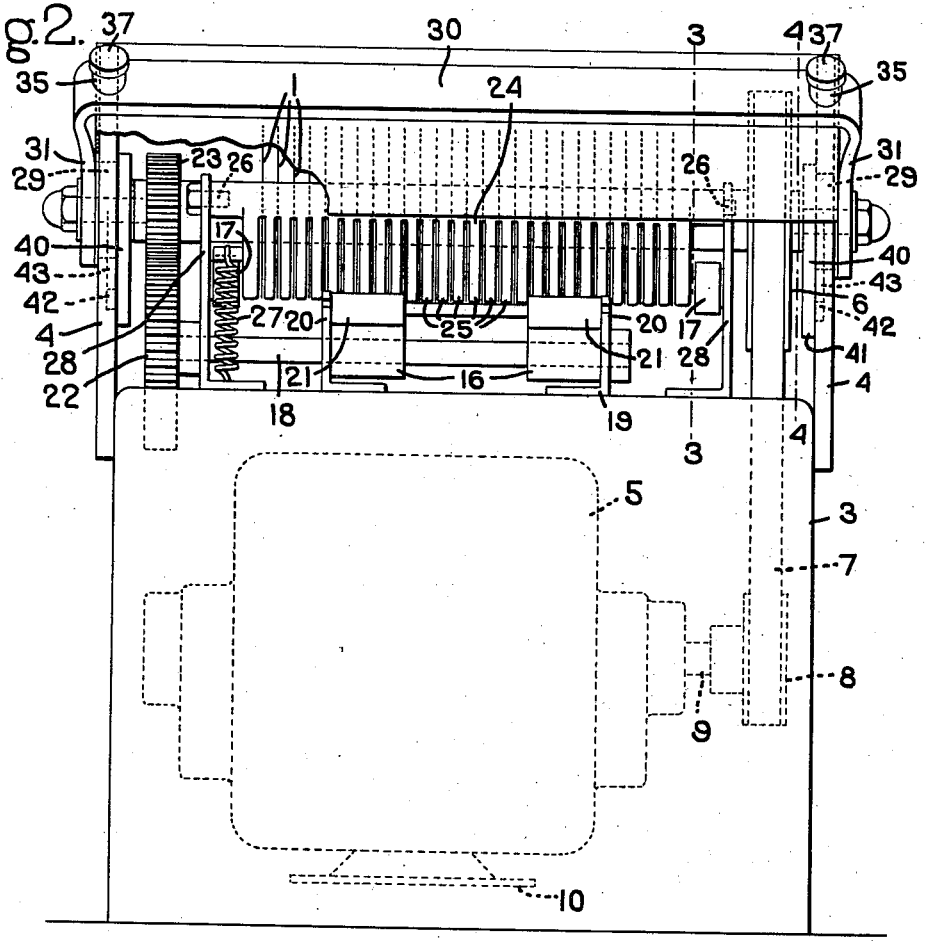
Fig. 2 is an end view thereof with part broken out.
Figure 9:
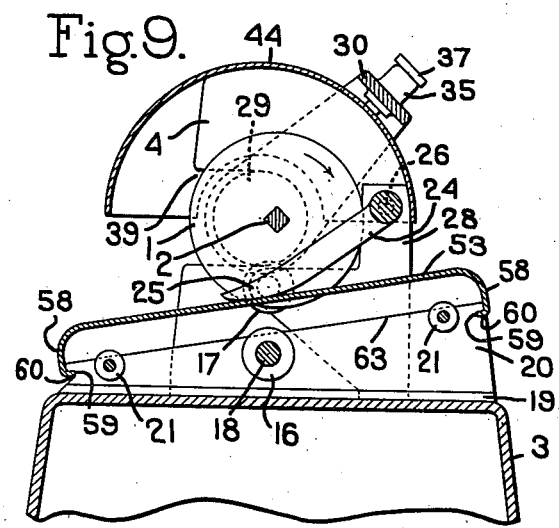
Figure 10:

Fig. 3 is a section on the line 3—3, Fig. 2, with the pulley 6 and belt 7 omitted;

Fig. 4 is a section on the line 4—4, Fig. 2, and illustrates the manner in which the protective cover and the knives can be removed from the machine;

Fig. 5 is a section on the line 5—5, Fig. 3;

Fig. 6 is a view showing a different way of driving the feed roll than that shown in Figs. 1 and 2;

Fig. 7 is a sectional view showing still a different embodiment of the invention, said view being taken on the line 7—7, Fig. 8; the bail shaped member being omitted;

Fig. 8 is a sectional view on the line 8—8, Fig. 7, and having the part 31 broken away;

Fig. 9 is a fragmentary sectional view showing the use of an attachment by which the knives may be caused to cut clear through the slice of meat, thereby cutting it into strips;

Fig. 10 is a fragmentary plan view of the meat support used in Fig. 9.

In the drawings, the rotary slitting knives by which the slits are cut in the meat are indicated at 1. These knives are mounted in spaced apart relation on a knife shaft 2 which is rotatably supported in the frame. The frame comprises a hollow base portion 3 and uprights 4 rising from each end thereof and in which the knife shaft 2 is supported.

The knife shaft 2 may be rotated in any suitable way and in the construction herein shown, a motor 5 is provided for this purpose which is located within the hollow base 3. The knife shaft 2 is provided with a pulley 6 at one end which is connected by a driving belt 7 to a pulley 8 on the motor shaft 9. The motor is shown as mounted on a platform 10 which is hung at one end on a pivot 11, as best seen in Fig. 1. With this arrangement, the weight of the motor serves to keep the belt 7 taut.

12 indicates a spring situated between the free end of the platform 10 and a boss or lug 13 rigid with the base 3 of the frame, said spring serving to cushion any upward movement of the motor platform and to assist the weight of the motor in holding the belt 7 taut.

The slice of meat to be slit is shown at 14 and it is carried beneath the knives for the purpose of having the slits cut therein by means of a meat supporting plate 15 on which the slice of meat is supported.

Suitable means are provided for supporting the plate 15 during its movement beneath the knives, and in the present embodiment of the invention, there is provided for this purpose two angle iron members 19 which are supported on the base portion 3 of the frame. The upper edge 63 of the vertical leg 20 of each angle iron member is preferably inclined, as shown in Fig. 1, thus making an inclined support for the plate 15.

While the plate 15 might rest on and slide along the upper inclined edges 63 of the angle iron members, yet I have shown herein two supporting rolls 21 which are journaled in the vertical legs 20 of the angle iron members and which serve as a support for the plate 15.

The feeding movement of the plate 15 is from the right to the left, or from the higher portion of the inclined edges 63 toward the lower portion thereof. The slitting knives 1 are rotating clockwise in Figs. 1 and 3, and the friction of the knives on the meat 14 will tend to feed the plate 15 forward. The machine is provided with means for applying to the plate 15 a retarding force acting to retard the movement which the plate would normally have by reason of the frictional engagement of the rotating knives with the meat supported on said plate, whereby the knives will operate on the meat with a draw cut.

This means is in the form of a driven feed roll 16 adapted to engage the under face of the plate, the frictional contact between the feed roll and the plate serving to control the forward movement of the plate. The feed roll is carried by a shaft 18 which is journaled in the vertical legs 20 of the angle iron members 19, and said roll is shown as formed in two sections, one section being situated adjacent each angle iron. The sections of the feed roll may conveniently be made of rubber or some other similar frictional material.

Cooperating with the feed roll 16 are two presser rolls 17 adapted to engage the upper face of the plate at its side edges, these rolls 17 being journaled in brackets 28 secured to the top of the frame base 3. The presser rolls 17 serve to hold the plate in firm frictional engagement with the feed roll 16 so that the latter will control the forward movement of the plate. The feed roll 16 is rotated at a proper speed to give the meat supporting plate 15 a linear speed much slower than the peripheral speed of the knives, and said feed roll and presser rolls thus apply to the plate a retarding force in opposition to the forward feeding movement which the plate would normally have by reason of the frictional engagement of the rapidly rotating knives with the meat.

Said feed roll may be rotated by any suitable means, and in Figs. 1 and 2, I have shown a construction in which the feed roll shaft 18 of the feed roll is geared to the knife shaft 2, the feed roll shaft 18 having a gear 22 thereon which meshes with and is driven by a gear 23 on the knife shaft 2. The gear 22 is larger than the gear 23, and the diameter of the feed roll 16 is considerably smaller than the gear 22 while the diameter of the knives 1 is considerably larger than the gear 23. With this construction, the surface speed of the feed roll 16 and consequently the linear speed of the plate 15 will be considerably less than the peripheral speed of the knives and the latter will thus act on the slice 14 with a draw cut.

The plate 15 may be separate and detachable from the frame, and in using the machine, a slice 14 of meat will be placed on the plate 15 and the latter then fed into the machine manually until the front edge of the plate is engaged by the feed roll 16 and the presser roll 17.

Thereafter, the plate will be fed forward by the feed roll at the required speed, and when the plate with the slice 14 thereon has been fed completely through the machine, the attendant will receive the plate with the slit slice of meat thereon. The passage of a slice of meat through the machine will cause a series of parallel slits to be cut in the meat, and it is a common practice to pass each slice of meat through the machine a second time and to so position the meat on the plate for the second pass that the slits which are cut in the meat will intersect those formed during the first pass of the meat through the machine.

24 indicates a stripper member which is provided with rigid non-yielding fingers 25 situated between the knives. This stripper member 24 is pivoted at 26 to brackets 28 that are mounted on the base 3 of the frame, and it is acted on by a pulling spring 27 which holds it yieldingly in contact with the upper surface of the slice 14 as the meat is fed through the machine. The stripper member 24 serves both to hold the meat onto the plate 15 and also serves to strip the meat from the knives as the meat is fed through the machine.

The knife shaft 2 is mounted in the frame for adjustment toward and from the feed roll 16, thereby providing for cutting slits of different depths in the slice 14. This is provided for by journaling the ends of the shaft 2 in circular bearings 29 which are mounted for turning movement in the uprights 4 of the frame. The shaft 2 is mounted in the bearings 29 eccentrically thereof, that is, the axis of the shaft 2 is off center with relation to the center of the bearing 29.

With this construction, the turning of the bearings 29 about their axes in the uprights 4 will result in moving the knife shaft 2 bodily toward and from the feed roll 16.

Manually operable means are provided to adjust the bearings 29 in the frame, and while various ways of providing for such manual adjustment may be used, I have chosen to show herein a bail-shaped member 30 having arms or legs 31 which are situated on the outside of the uprights 4 and are secured to the bearings 29 by means of suitable screws 32. The swinging of this member 30 from the full line position, Fig. 3, toward or into the position shown in Fig. 4 will rotate the bearings 29 in the uprights 4 and will thereby raise the knife shaft relative to the feed roll 16.

Means are provided for locking the bail member in any adjusted position, and for this purpose, it is provided at each end with a spring pressed locking pin 33 adapted to engage in any one of a plurality of sockets 34 formed in the upper edge of the upright 4, said upper edge being curved on the arc of a circle having for its center the axis of the bearings 29. Each spring pressed pin 33 is carried in a boss 35 with which the member 30 is provided and is acted on by a spring 36 tending to hold it in its lowered position. The upper end of each pin has a head 37 by which it may be withdrawn from locking engagement with the socket 34.

The apertures 38 in the uprights 4 in which the bearings 29 are received are open at one side of the uprights as shown at 39, the openings 39 being sufficiently wide to permit the bearings to be withdrawn from the apertures 38.

Each bearing member has a retaining plate 40 secured to its inner face which overlies the inner face of the upright 4, and each retaining plate has an extension 41 provided at its lower end with a projection 42 that is received in a groove 43 formed in the inner face of the upright 4. This groove 43 is a curved groove and is concentric with the axis about which the bearing member 29 turns.

When the bail 30 is locked to the uprights 4 and the projection 42 of each retaining plate is occupying its groove 43, the bearing members 29 will be securely retained in place, but when the bail member is swung into the position shown in Fig. 4, the projections 42 are carried to the upper ends of the slots 43 as shown in Fig. 4.

44 indicates a guard member or hood which covers and guards or protects the knives 1. This guard member or hood is shown as semi-cylindrical in form and it rests on the curved upper edge 45 of the uprights 4. Said hood or guard member is formed with ends 47 which overlie the outer faces of the uprights 4 and each end 47 is provided with a semi-circular recess 48 in which the corresponding bearing member 29 is received.

An interlocking connection between the manually operable member 30 and the guard member is provided by which the guard member will be held in place. In the construction shown, the pins 33 provide such interlocking connection, the hood or guard member having apertures 46 therethrough coinciding with the recesses 34 and in which the pins 33 may be received. These pins 33, therefore not only lock the member 30 in its adjusted position, but they also serve to hold the guard member 44 in place.

The guard member is removable from the frame, but can only be removed after the bail member 30 has been swung into the position shown in Fig. 4. When the bail 30 is in this position and the locking pins 33 are retracted, the hood or guard 44 can be moved backwardly and upwardly into the dotted line position, Fig. 4, and thus removed from the machine.

The knife assembly, including the knife shaft 2 with the knives thereon, the bearing members 29 and the bail member 30, can be removed as a unit from the machine, and such removal provides for readily cleaning the knife assembly or sharpening the knives, or replacing any damaged or injured knives. In order to thus remove the knife assembly, it is necessary first to swing the bail member into the full line position, Fig. 4, and then to remove the guard member 44. After the guard member has been removed, as shown in dotted lines, Fig. 4, then the knife assembly may be moved to the left, Fig. 4, and thus taken out of the machine, the open sides 39 of the apertures 38 permitting the removal of the bearing members 29 from the uprights 4.

It will be noted that the upper end of each groove 43 has a horizontal groove 50 communicating therewith, which groove 50 leads to the aperture 38. When the bail member 30 has been swung into the full line position, Fig. 4, the projections 42 are carried to the upper ends of the grooves 43, and the connecting grooves 50 provide a passage through which said projections 42 may pass when the knife assembly is removed.

In this construction, therefore, the removal of the hood 44 involves shifting the position of the knife assembly from that shown in Fig. 3 to that shown in Fig. 4, thereby raising the knives from their lowered position to their elevated position. Furthermore, with this construction the knife assembly can be removed only by first removing the hood 44.

In Figs. 1 and 2 I have shown the feed roll 16 as driven directly from the knife shaft 2 through the medium of intermeshing spur gears. Since the knife shaft is capable of adjustment in a vertical direction, it is necessary to use gears having sufficiently long teeth to permit the knife shaft to be raised into the position shown in Fig. 4 without carrying the gears out of mesh with each other.

A different manner of operating the feed roll is shown in Fig. 6 wherein the feed roll shaft 18 is connected to the knife shaft 2 through the medium of a crossed belt 61. In this embodiment, the knife shaft 2 has a belt pulley 51 thereon around which the belt 61 passes and the feed roll shaft 18 likewise has a belt pulley 52 thereon to receive the belt, the pulley 52 being larger than the pulley 51 so as to provide a reduced speed of rotation of the feed roll shaft 18 relative to that of the knife shaft 2, thereby obtaining the desirable draw cut.

This belt 61 may be an elastic belt which will stretch as needed to accommodate the vertical adjustment of the knife shaft 2.

In Figs. 7 and 8 I have shown a still different embodiment of the invention wherein the feed roll shaft 18 is driven by the motor shaft 9 instead of from the knife shaft 2.

The motor shaft has a small pulley 54 thereon which is connected by a crossed belt 55 to a larger pulley 56 on the feed roll shaft 18.

The machine, as shown in Figs. 1 to 8, is designed to cut slits in the slice 14 of meat, which slits extend nearly but not entirely through the slice. The bail-shaped member 31 is omitted from Fig. 7 and is broken out in Fig. 8.

In Figs. 9 and 10 I have shown a modified form of the device by means of which the slice 14 can be cut entirely through so as to cut it into separate strips.

To provide for this, I propose to employ a grid member 53 which is adapted to be supported on the angle iron members 19 and which is provided with slots 57 in which the lower portions of the knives 1 operate. When a slice of meat is placed on said grid and fed forwardly to the left, Fig. 9, it will be cut into strips by the knives because the lower edges of the knives extend below the surface on which the meat is supported.

This grid 53 is constructed so that it can be readily applied to or removed from the angle iron members 19 and it provides a simple means for converting the machine from one which cuts in the slice of meat slits that extend only part way through to one which cuts the slice into separate strips.

This grid member 53 can conveniently be made of sheet metal and at its ends it has the down-turned portions 58 terminating in the inwardly extending lips 59 that are received in notches 60 formed in the ends of the vertical legs 20 of the angle irons 19. The member 56 is sufficiently resilient so that it may be applied to the angle irons 20 by bending the ends 58 outwardly to a sufficient extent to permit the lips 59 to be snapped into the recesses 60.

I claim:

1. A meat slitting machine comprising a frame, a set of rotary slitting knives carried thereby, a meat-supporting member on which the meat to be slit is supported, a removable guard member for protecting the knives stationarily supported on the frame, and means for adjusting the knives toward and from the meat-supporting member without shifting the position of the guard member, said means having provision for locking the guard member in position.

2. A meat slitting machine comprising a frame, a set of rotary slitting knives carried thereby, means to rotate the knives, a meat-supporting member, adjusting means for relatively adjusting the knives and the meat-supporting member to provide for cutting slits of different depths in the meat, a guard member for the knives separate from said adjusting means and stationarily supported on the frame, and a guard-locking device carried by said adjusting means.

3. A meat slitting machine comprising a frame, a rotary knife shaft, a plurality of knives mounted thereon, meat feeding means for feeding a slice of meat into position to be slit by the knives, bearing members carried by the frame and capable of turning therein, said knife shaft being journaled in the bearing members eccentrically thereof, means for turning the bearing members in the frame, thereby adjusting the knives toward and from the meat feeding means, a guard member for the knives, and means constituting an interlocking connection between the guard member and the means for turning the bearing members.

4. A meat slitting machine comprising a frame, bearing members carried by the frame and capable of turning therein, a rotary knife shaft journaled in said bearing members eccentrically thereof, a plurality of knives carried by the knife shaft, a manually operable member secured to the bearing members and by which they may be turned, thereby to adjust the knives, a guard member for the knives, and an interlocking connection between the manually operable member and the guard member.

5. A meat slitting machine comprising a frame, bearing members carried thereby and capable of turning therein, a knife shaft journaled in the bearing members eccentrically thereof, a plurality of knives carried by the knife shaft, a bail-shaped manually operable member having its arms secured to said bearing members and by which the latter can be turned in the frame to adjust the knives, means for feeding a slice of meat into position to be slit by the knives, a guard member for the knives, and means carried by the bail-shaped member for holding the guard member in operative position.

6. A meat slitting machine comprising a frame, bearing members carried thereby and capable of limited turning movement therein, a knife shaft journaled in the bearing members eccentrically thereof, a plurality of knives on the knife shaft, meat feeding means feeding a slice of meat into position to be slit by the knives, a manually operable member connected to the bearing members and by which they may be turned through their limited turning movement, thereby to adjust the knives toward and from the meat feeding means, and a guard member for the knives, said manually operable member having means for locking the guard member to the frame except when it is in one extreme position, said guard member being free to be removed from the frame when said manually operable member occupies said extreme position.

7. A meat slitting machine comprising a frame having a plurality of recesses, bearing members carried by the frame and capable of limited turning movement therein, a knife shaft journaled in the bearing members eccentrically thereof, a plurality of knives carried by the knife shaft, a bail-shaped member having its arms secured to the bearing members and by which the latter can be turned from one extreme position to the other, and a locking pin carried by the bail-shaped member and adapted to engage in any one of said recesses to lock the bail-shaped member and the knives in different adjusted positions.

8. A meat slitting machine comprising a frame having a plurality of recesses, bearing members carried by the frame and capable of limited turning movement therein, a knife shaft journaled in the bearing members eccentrically thereof, a plurality of knives carried by the knife shaft, a bail-shaped member having its arms secured to the bearing members and by which the latter can be turned from one extreme position to the other, and a locking pin carried by the bail-shaped member and adapted to engage in any one of said recesses to lock the bail-shaped member and the knives in different adjusted positions, said guard member having apertures to receive said pin, whereby the latter also locks the guard member to the frame.

9. A meat slitting machine comprising a frame having a plurality of recesses, bearing members carried by the frame and capable of limited turning movement therein, a knife shaft journaled in the bearing members eccentrically thereof, a plurality of knives carried by the knife shaft, a bail-shaped member having its arms secured to the bearing members and by which the latter can be turned from one extreme position to the other, a guard member for the knives having apertures registering with the recesses in the frame, and a locking pin carried by the bail-shaped member and adapted to engage in any one of said recesses and the corresponding aperture in the frame, thereby to lock the bail-shaped member and the knives in different adjusted positions, and also to lock the guard member to the frame, said guard member being removable from the frame when the bail-shaped member is in one of its extreme positions.

10. A meat slitting machine comprising a frame having a plurality of recesses, bearing members carried by the frame and capable of limited turning movement therein, a knife shaft journaled in the bearing members eccentrically thereof, a plurality of knives carried by the knife shaft, a bail-shaped member having its arms secured to the bearing members and by which the latter can be turned from one extreme position to the other, a guard member for the knives having apertures registering with the recesses in the frame, and a locking pin carried by the bail-shaped member and adapted to engage in any one of said recesses and the corresponding aperture in the guard member, thereby to lock the bail-shaped member and the knives in different adjusted positions, and also to lock the guard member to the frame, said guard member being removable from the frame when the bail-shaped member is in one of its extreme positions, said bearing members and the knife assembly also being removable from the frame when the bail-shaped member is in said extreme position.

11. A meat slitting machine comprising a frame, bearing members carried by the frame, a set of rotary slitting knives rotatably mounted therein, a meat supporting member on which a slice of meat may be fed through the machine, manually operable means for adjusting the knives toward and from the meat supporting member, a guard member for the knives stationarily carried by the frame and separate from the means for adjusting the knives and means providing an interlocking engagement between the guard member and the manually operable means.

12. A meat slitting machine comprising a frame, bearing members carried by the frame and capable of turning therein, a rotary knife shaft journaled in said bearing members eccentrically thereof, a plurality of knives carried by the knife shaft, a manually operable member secured to the bearing members and by which they may be turned, thereby to adjust the knives vertically, a guard member for the knives, and means providing an interlocking engagement between the guard member and said manually operable member.

13. A meat slitting machine comprising a frame, bearing members removably carried by the frame and capable of turning therein, a rotary knife shaft journaled in said bearing members eccentrically thereof, a plurality of knives carried by the knife shaft, a manually operable member secured to the bearing members and by which they may be turned, thereby to adjust the knives vertically, a guard member for the knives, and means carried by the manually operable member to retain the guard member in position.

14. A meat slitting machine comprising a frame, a set of rotary slitting knives removably carried thereby, means to rotate the knives, meat-supporting means on which a slice of meat to be slit is supported, a feed roll with which said meat-supporting means engages and by which it is fed under the knives, means to rotate the feed roll with a surface speed slower than the peripheral speed of the knives, means for adjusting the knives vertically to provide for cutting slits of different depths, a guard member for the knives, which guard member is removable from the frame separately from the knives, and means associated with the knife-adjusting means to lock the guard member to the frame.

15. A meat slitting machine comprising a frame, a set of rotary slitting knives carried thereby, a meat-supporting member on which the meat to be slit is supported, a removable guard member for protecting the knives, means, including a swinging bail-shaped member, for relatively adjusting the knives and the meat-supporting member toward and from each other, said guard member having a plurality of apertures, and a locking pin carried by the bail-shaped member for engaging in any one of said apertures, thereby locking the guard member in position and also locking said bail-shaped member in its adjusted position.

16. A meat slitting machine comprising a frame, bearing members carried thereby and capable of turning therein, a rotary knife shaft journaled in said bearing members eccentrically thereof, a plurality of knives carried by the knife shaft, a bail-shaped member having its arm secured to the bearing members and by which the latter may be turned in the frame to adjust the knives, a guard member for the knives provided with apertures, and a locking pin carried by the bail-shaped member and adapted to engage in any one of the apertures of the guard member.

JOSEPH P. SPANG.